Inventor:
Wilhelm Poppe
by Karlitishaini
Atty.

June 8, 1937.  W. POPPE  2,083,201
PROCESS FOR THE PRODUCTION OF PATTERNED RUBBER
SLABS FOR COVERING FLOORS, WALLS, AND CEILINGS
Filed July 14, 1934  2 Sheets-Sheet 2

Inventor:
Wilhelm Poppe
by Karl Michaelis
Atty.

Patented June 8, 1937

2,083,201

UNITED STATES PATENT OFFICE 2,083,201

PROCESS FOR THE PRODUCTION OF PATTERNED RUBBER SLABS FOR COVERING FLOORS, WALLS, AND CEILINGS

Wilhelm Poppe, Giessen, Germany

Application July 14, 1934, Serial No. 735,217
In Great Britain July 19, 1933

9 Claims. (Cl. 18—61)

This invention relates to patterned rubber slabs for covering floors, walls, ceilings and the like. Such slabs have hitherto been made by mixing vulcanizable differently colored masses by means of kneading devices which roll the mixture out into slabs and at the same time vulcanize it. In this way, a mottling is unavoidably obtained, i. e. a patterning of the slabs in which the differently colored portions of the mass are, according to the extent and the frequency of the kneading, more or less longitudinally or transversely stretched and the borders of the different colors are more or less effaced.

It is an object of this invention to produce slabs in which the differently colored parts of the mass are not stretched perceptibly and the borders of the differently colored portions are sharp or not very much effaced. It is true that it has already been possible to produce such slabs by mixing with a mass, that is still vulcanizable, vulcanized pieces of different color, which do not yield to pressure plastically but elastically, and then kneading the mixture and rolling it out for vulcanization. This process involves the disadvantage that the previously vulcanized pieces are torn and the maintenance of the shape of these pieces is therefore only possible under conditions which cannot always be observed. The slabs produced in this way are not homogeneous as the previously vulcanized pieces in the finished slabs possess other properties than the constituents, which were vulcanized only after the mixing. This lack of homogeneity involves a lack of uniformity in wear.

It has also been proposed to vulcanize loose masses of entirely unvulcanized particles of different colors in moulds under static pressure, i. e. without kneading, rolling out, etc. It was, however, believed that it was possible in this manner to obtain homogeneous slabs only from a mass of particles of the same very small order of size throughout, i. e. with particles of the size of small grains. However, experiments have shown that this assumption was erroneous and that homogeneous slabs can be obtained, from loose still unvulcanized pieces assembled together and subjected to static pressure, if the pieces are very much larger and differ greatly in size, being of any desired shape, so that there can be produced not only patterns of one and the same kind, but also patterns of any desired kind.

In its broadest aspect the present invention consists in a process for the production of rubber slabs for covering floors, walls, ceilings, and the like, wherein a mass of differently colored blocks of unvulcanized rubber, or which individually may be composed of a plurality of colors, are placed in a mould in loose juxtaposition, the blocks thus assembled being then compressed into a compact slab by the shape of the individual blocks being somewhat changed, so that the sticky blocks will adhere to each other without leaving any gaps between them, whereupon the slabs are vulcanized.

In carrying the invention into practice, vulcanization is effected under a high but static pressure in a mould which is such as to form the vulcanized mass into the shape of a slab of the desired dimension of surface or a greater dimension and the desired thickness or twice or a greater multiple of the desired thickness. Slabs of twice or a greater multiple of the desired thickness may subsequently be split into slabs of the desired thickness.

The slabs that have been made in this manner are of the best quality and the previously loose pieces appear on their exterior surfaces only as still fairly sharply defined colored patches with shapes corresponding to the original shapes; moreover, the pieces are quite homogeneous and are connected with each other without gaps.

The process also enables a number of colored groups to be arranged in a definite special relationship to each other. For this purpose, suitably shaped pieces of the required colors are placed next to or stuck to each other before being placed in the mould. For example, sheets of different colours are arranged in superposition and the differently coloured sheets are then cut up into small blocks. These blocks on being assembled and compressed and vulcanized form multicolored patches in a definite sequence and shape.

It is immaterial of what shape are the individual pieces assembled into sheets. I may use differently colored rubber threads, strings or bands, and the like. Also pieces of different shapes or color combinations may be employed at the same time. In this way the most varied patterns can be obtained.

In general the process is carried out in the following manner:—

Small rubber blocks of different colors or groups of colors and sizes, corresponding to the desired pattern, are measured off by volume or weight, the number or mass of such blocks being chosen in proportion to the frequency of occurrence of the individual colors or groups of colors and shapes in the pattern. These blocks are then mixed together intimately until the frequency of the pieces of the same kind is the same all over.

The mixture of loose pieces that is obtained in this way is placed in a mould and is vulcanized therein under a high static pressure.

Since the relationships of the frequencies of the pieces of different kind are the same all over, the patches of the different shapes and colors also occur equally frequently all over in the surface of the mass that has been vulcanized into a slab. Therefore, to this extent the pattern is the same all over in the individual slab and also in all the slabs made in this manner. As, however, the pieces are not specially arranged individually in the mould before vulcanization, and have consequently been arranged arbitrarily and haphazardly, the colored patches or patches of groups of colors on the surface of each finished slab, that are due to pieces of the same kind of shape and the same color or the same combination of colors, are not quite the same but are different from each other.

It is however also possible to thus produce slabs with geometrical patterns. For this purpose, insertions, suitably made of sheet metal, may be loosely inserted in the mould to be filled with the blocks, and these insertions subdivide the mould in accordance with the design of the pattern. If there are placed between these partitions mixtures of loose pieces differing from each other as to shape, color, or color combinations and if the partitions are then removed and the filling as a whole vulcanized, there is obtained a slab with a correspondingly designed pattern.

According to the invention, there may be employed instead of insertions of sheet metal or the like which are taken out before the vulcanization, insertions of unvulcanized rubber which are not taken out but are vulcanized along with the blocks. In this manner the differently patterned portions of the surface of the slabs may be separated by definitely colored or even patterned border strips.

In the case where there are provided border strips of a color which occurs as a ground color in the patterned portions of the surface, the other colors act as if they had been superficially inserted into this ground color of the slab. If, in this case, the border strips are so placed that they run along the outer edges of the slabs, and the slabs are placed edge to edge, the joints between the abutting edges cannot easily be seen. On the other hand, in the case of patterns which are irregular up to the abutting edges, the latter are clearly visible.

Two cases of the production of slabs according to the invention are represented as examples in the drawings.

In the drawings affixed to this specification and forming part thereof the new process is illustrated diagrammatically by way of example.

Fig. 1 illustrating the character and constitution of patterned rubber sheets, which are cut into blocks to be used in the production of the slabs or sheets forming the final product of the process.

Figs. 4, 5 and 6 illustrate another modified form of this process, in which Fig. 4 is a perspective view of a composite rubber sheet, from which are cut the cubes shown in Fig. 5, which are then combined into a slab such as shown in Fig. 6.

The different colors of the pieces or parts of pieces and the patches of color in the surfaces of the finished slabs are indicated by different shadings in black and white.

Figure 3:
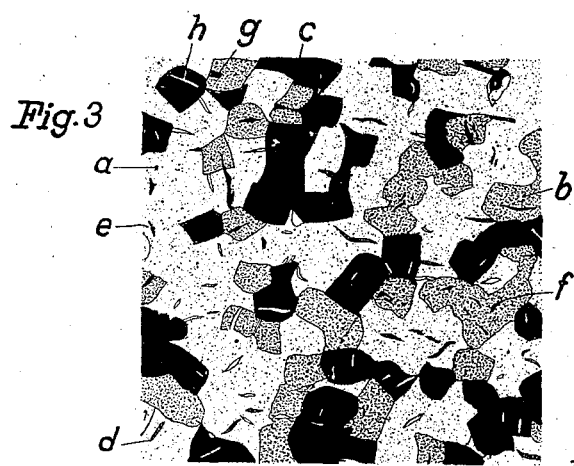
Fig. 3 illustrates a slab forming the product of the process, which is obtained by uniting by pressure the unvulcanized blocks shown in Fig. 2.

The production of a slab as shown in Figure 3 is effected in the following manner:—

Three unvulcanized plates $a$, $a^1$, $a^{11}$ all of one color are placed one on top of the other with the interposition of thin unvulcanized rubber bands or threads $d$ and $e$ of other colors and will stick together, owing to the adhesive properties of the unvulcanized rubber, to form a plate $a$, $a^1$, $a^{11}$. In the same manner a plate $b$, $b^1$, $b^{11}$, of different color is produced with interposed bands or threads $f$ and $g$ and a plate $c$, $c^1$, $c^{11}$ of a third color is produced also with interposed bands or threads $h$; the colors of the bands or threads $f$, $g$ and $h$, although they differ from the colors of the plates with which they are associated, may be the same as the colors of the bands or threads $d$ and $e$.

Figure 2:
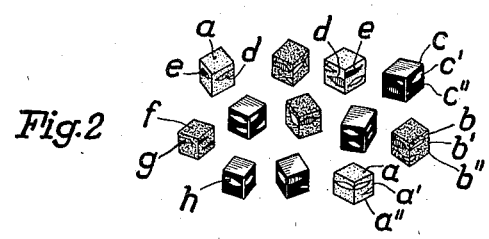
Fig. 2 is a perspective view of a number of such blocks or cubes.

The plates are now cut up across the surfaces of the layers into blocks of uniform or different shapes and sizes. In Figure 2 the shapes and sizes are, for example, all the same. Thereupon predetermined proportions (measured by weight or volume in accordance with the pattern desired) of pieces of the three different kinds $a$, $b$ and $c$ are mixed, and the mixed blocks are then filled into the mould and vulcanized therein under a high pressure to form the finished slab shown in Figure 3. The differently colored constituents of the pieces $a$, $b$ and $c$ shown in Figure 2 appear as corresponding patches of color on the surface of the finished slab shown in Figure 3.

Figure 1:
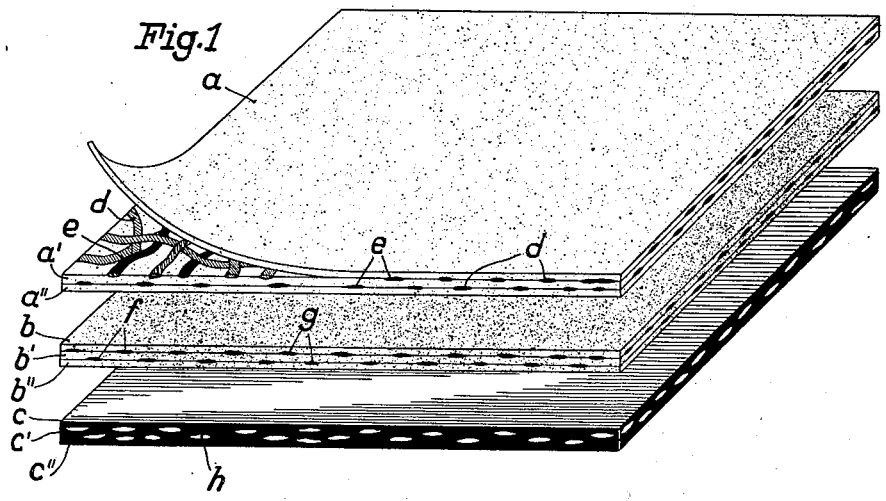
Figure 4:
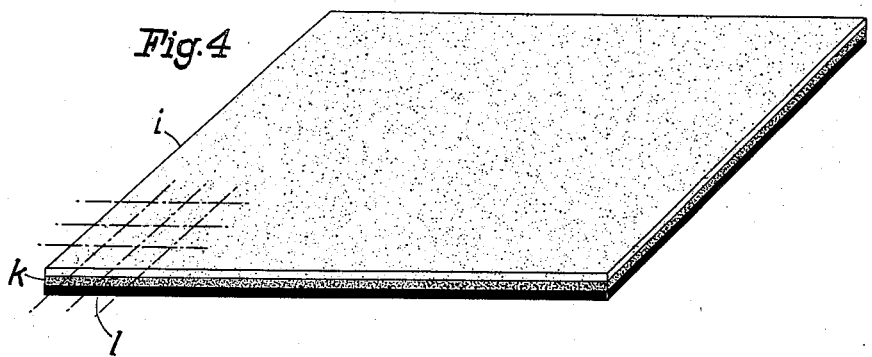
Figure 5:
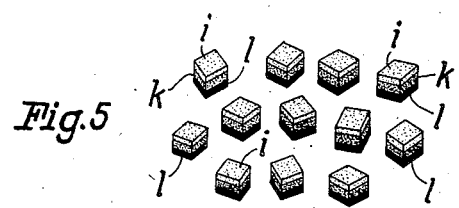
Figure 6:
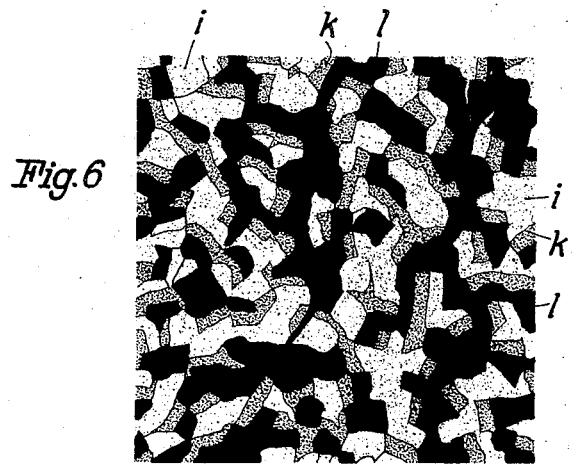

The process for the production of slabs according to Figure 6 differs from the process just described only in that the loose blocks that are to be vulcanized together and represented in Figure 5 are not, as in the case of the slab of Figures 1 to 3, pieces of three different unvulcanized plates, but are pieces of a single plate, i. e. the plate $i$, $k$, $l$ shown in Figure 4. It is true that this plate consists of a number of partial plates—the partial plates $i$, $k$, and $l$—assembled together, but these partial plates are not, as in the case of the slab of Figures 1 to 3, of the same color throughout the plate but are of three different colors. In the pattern of the finished plate according to Figure 6, there are therefore many groups of patches of color with a regular sequence of the three colors which is the same as shown by the loose blocks. In the finished pattern there are in addition patches of a particular color of the two covering plates $i$ and $l$ of Figure 4, which patches are produced by the blocks shown in Figure 5 presenting in the surface of the slab that side which bears that particular color.

Various changes may be made in the details disclosed in the foregoing specification without departing from the invention or sacrificing the advantages thereof.

I claim:—

1. The process of producing patterned rubber slabs which comprises arranging in a mold a plurality of differently colored substantially prismatic blocks of unvulcanized rubber in loose juxtaposition, acting on the blocks thus assembled with static pressure to cause the blocks to adhere to each other under slight deformation and to form a slab free from gaps, and subjecting such slab to vulcanization.

2. The process of producing patterned rubber slabs which comprises superimposing two unvulcanized rubber sheets between which are inserted unvulcanized rubber pieces of a different color, cutting through the assembled sheets and pieces to form multicolored rubber blocks, arranging a plurality of such blocks in a mold in loose juxtaposition, acting on the blocks thus assembled with static pressure to cause the blocks to adhere to each other under slight deformation and to form a slab free from gaps, and subjecting such slab to vulcanization.

3. The process of producing patterned rubber slabs which comprises superimposing several differently colored pairs of unvulcanized rubber sheets, with unvulcanized rubber pieces of a color differing from the color of the sheets inserted between the sheets of each pair, cutting through the assembled sheets and pieces to form multicolored rubber blocks, arranging a plurality of such blocks in a mold in loose juxtaposition, acting on the blocks thus assembled with static pressure to cause the blocks to adhere to each other under slight deformation and to form a slab free from gaps, and subjecting such slab to vulcanization.

4. The process of producing patterned rubber slabs which comprises superimposing two unvulcanized rubber sheets between which are inserted unvulcanized rubber bands of a different color, cutting through the assembled sheets and bands to form multicolored rubber blocks, arranging a plurality of such blocks in a mold in loose juxtaposition, acting on the blocks thus assembled with static pressure to cause the blocks to adhere to each other under slight deformation and to form a slab free from gaps, and subjecting such slab to vulcanization.

5. The process of producing patterned rubber slabs which comprises superimposing several differently colored pairs of unvulcanized rubber sheets with unvulcanized rubber bands of a color differing from the color of the sheets inserted between the sheets of each pair, cutting through the assembled sheets and bands to form multicolored rubber blocks, arranging a plurality of such blocks in a mold in loose juxtaposition, acting on the blocks thus assembled with static pressure to cause the blocks to adhere to each other under slight deformation and to form a slab free from gaps, and subjecting such slab to vulcanization.

6. The process of producing patterned rubber slabs which comprises arranging in a mold layers of blocks of unvulcanized rubber, the blocks in each layer being arranged in loose juxtaposition, acting on said layers of blocks with static pressure to cause the blocks and the layers to adhere to each other under slight deformation and to form a slab free from gaps, and subjecting such slab to vulcanization.

7. The process of producing patterned rubber slabs which comprises arranging in a mold heaps of blocks of unvulcanized rubber, the blocks in each heap being arranged in loose juxtaposition, arranging rubber partitions between adjoining heaps, acting on the blocks and partitions with static pressure to cause the blocks to adhere to each other and the heaps of blocks to adhere to said partitions under slight deformation, and to form a slab free from gaps, and subjecting such slab to vulcanization.

8. The process of producing patterned rubber slabs which comprises superimposing several differently colored pairs of unvulcanized rubber sheets, with unvulcanized rubber pieces of a color differing from the color of the sheets inserted between the sheets of each pair, cutting through the assembled sheets and pieces to form multicolored rubber blocks, assembling blocks of the same kind into heaps, juxtaposing such heaps in a mold, acting on the heaps of blocks with static pressure to cause the blocks and heaps to adhere to each other under slight deformation and to form a slab free from gaps, and subjecting such slab to vulcanization.

9. The process of producing patterned rubber slabs which comprises superimposing several differently colored pairs of unvulcanized rubber sheets with unvulcanized rubber pieces of a color differing from the color of the sheets inserted between the sheets of each pair, cutting through the assembled sheets and pieces to form multicolored rubber blocks, arranging a plurality of such blocks in a heap, juxtaposing such heaps, and rubber partitions separating the heaps in a mold, acting on the said heaps and partitions with static pressure to cause the blocks to adhere to each other and the heaps of blocks to adhere to said partitions under slight deformation and to form a slab free from gaps, and subjecting such slab to vulcanization.

WILHELM POPPE.